United States Patent [19]
Matsuoka et al.

[11] Patent Number: 5,561,665
[45] Date of Patent: Oct. 1, 1996

[54] AUTOMATIC FREQUENCY OFFSET COMPENSATION APPARATUS

[75] Inventors: Akihiko Matsuoka, Yokohama; Masayuki Orihashi, Ichikawa; Kenichi Takahashi, Kawasaki; Hiroshi Ohnishi, Tokyo, all of Japan

[73] Assignee: Matsushita Electric Industrial Co., Ltd., Osaka, Japan

[21] Appl. No.: 509,664

[22] Filed: Jul. 31, 1995

[30] Foreign Application Priority Data

Aug. 11, 1994 [JP] Japan .................................. 6-189497

[51] Int. Cl.$^6$ ................................................ H04L 27/34
[52] U.S. Cl. .............................................. 370/20; 375/344
[58] Field of Search ........................ 370/19, 20, 105.3, 370/32; 375/261, 266, 344

[56] References Cited

U.S. PATENT DOCUMENTS

| | | | |
|---|---|---|---|
| 5,255,290 | 10/1993 | Anvari | 375/344 |
| 5,282,228 | 1/1994 | Scott et al. | 375/344 |
| 5,343,499 | 8/1994 | Jasper et al. | 375/344 |
| 5,412,695 | 5/1995 | Murata | 375/344 |
| 5,440,587 | 8/1995 | Ishikawa et al. | 375/344 |

*Primary Examiner*—Wellington Chin
*Attorney, Agent, or Firm*—Rossi & Associates

[57] ABSTRACT

An automatic frequency compensation apparatus comprises: a frequency offset prediction portion for predicting a frequency offset of an oscillation signal used for receiving a TDM digital modulation signal from the center frequency of the TDM digital modulation signal using a quadrature baseband signal derived from the TDM digital modulation signal, a vector correlation portion detecting a correlation between the quadrature baseband signal and a predetermined signal, the frequency offset prediction portion predicting when the correlation exceeds a reference value, and a frequency offset compensation portion effects a frequency offset compensation to the quadrature baseband. A convergent coefficient may be decreased with the number of events that the correlation exceeds the reference value. An equalizer may be further provided after the frequency offset compensation portion and the prediction is made using the output of the equalizer. The prediction is effected during the training period or during the training period when the correlation exceeds the reference value. The correlation may be detected using the output of the equalizer and a signal obtained by judging or digitizing the output of the equalizer.

6 Claims, 6 Drawing Sheets

5,561,665

AUTOMATIC FREQUENCY OFFSET COMPENSATION APPARATUS

BACKGROUND OF THE INVENTION

1. Field of the Invention

This invention relates to an automatic frequency offset compensation apparatus for effecting a frequency offset compensation to a received digital modulated radio signal.

2. Description of the Prior Art

An automatic frequency offset compensation apparatus for performing a frequency offset compensation is known. Such a prior art automatic frequency offset compensation apparatus obtains a vector phase difference between a complex baseband signal derived from a quadrature detection of a received modulated radio waves and a predetermined frame synchronizing signal and performs the frequency offset compensation using the vector phase difference.

FIG. 6 is a block diagram of a prior art automatic frequency offset compensation apparatus. A vector correlation portion 602 generates a vector correlation signal 603 from a quadrature baseband signal 601 and a predetermined vector signal 604. A frequency offset prediction portion 605 renews a prediction value 606 of a frequency offset using the quadrature baseband signal 601 and the predetermined vector signal 604 only when an absolute value of the vector correlation signal 603 exceeds a predetermined a correlation threshold value. A frequency offset compensation portion 607 compensates the quadrature baseband signal 601 using the renewed frequency offset prediction value 606 and outputs a compensated quadrature baseband signal 608.

This prior art automatic frequency compensation apparatus has a problem that if a received signal includes a large amount of distortion due to the multipass phasing or the like, a possibility that the absolute value of the vector correlation signal exceeds the predetermined correlation threshold value is low, so that an interval of the prediction of the frequency offset becomes long.

SUMMARY OF THE INVENTION

The aim of the present invention is to provide an improved automatic frequency offset compensation apparatus.

According to this invention, there is provided a first automatic frequency compensation apparatus comprising: a first difference vector generation portion for continuously generating at least a difference vector provided between first signals in two consecutive first symbol intervals of a quadrature baseband signal per the first symbol interval, the quadrature baseband signal being provided through a non-synchronizing quadrature detection of a time-division-multiples digital modulation signal received and for normalizing the difference vector; a second difference vector generation portion for generating a predetermined difference vector provided between second signals in two consecutive second symbol intervals of a predetermined time-division multiplex frame synchronizing signal; a vector correlation portion responsive to the first and second difference vector generation portions for providing a frame vector correlation signal indicative of a correlation between the normalized difference vector and the predetermined difference vector; a comparing portion for comparing the frame vector correlation signal with a predetermined value and generating a comparing result signal; a counting portion for counting the comparing result signal when the vector correlation is larger than the predetermined value; a frequency offset prediction portion responsive to the comparing result signal for predicting a frequency offset of an oscillation signal used for receiving the time-division-multiplex digital modulation signal from a center frequency of the time-division-multiples digital modulation signal in accordance with the normalized difference vector and the predetermined difference vector, renewing the predicted frequency offset using a convergent coefficient when the vector correlation is larger than the predetermined value, and decreasing tile convergent coefficient with an increase in an output of the counting portion; and a frequency offset compensation portion for rotating a phase of the baseband signal in accordance with the predicted frequency offset to output the frequency offset compensated baseband signal.

In the first automatic frequency compensation apparatus, the comparing portion may further respond to a frame signal of the quadrature baseband signal and compares and generates the comparing result signal once a frame of the frame signal.

In the first automatic frequency compensation apparatus, the comparing portion may compare and generate the comparing signal irrespective of a frame of the quadrature baseband signal.

In the first automatic frequency compensation apparatus, a convergent coefficient may be decreased with the number of events that the correlation exceeds the reference value. An equalizer may be further provided after the frequency offset compensation portion and the prediction is made using the output of the equalizer. That is, according to this invention, there is provided a second automatic frequency compensation apparatus comprising: a frequency offset compensation portion for, in accordance with a frequency offset detection signal, rotating a phase of a quadrature baseband signal provided through a non-synchronizing quadrature detection of a time-division-multiples digital modulation signal received; an equalizing portion, having tap coefficients, for equalizing the quadrature baseband signal from the frequency offset compensation portion to remove a distortion included in the quadrature baseband signal from the frequency offset compensation portion and outputting the frequency offset compensated and equalized baseband signal in a normal operation and for performing a training to determine the tap coefficients or a condition of the equalizing portion, using a predetermined training signal included in the quadrature baseband signal in a training mode such that the distortion is further removed; a first difference vector generation portion for continuously generating a difference vector between signals in two consecutive symbol intervals of the quadrature baseband signal from the equalizing portion and normalizing the difference vector; a second difference vector generation portion for generating a predetermined difference vector provided between signals in two consecutive symbol intervals of a predetermined time-division multiplex frame synchronizing signal; and a frequency offset prediction portion for predicting a frequency offset between an oscillation signal used for receiving the time-division-multiplex digital modulation signal and a center frequency of the time-division-multiplex digital modulation signal in accordance with the normalized difference vector and the predetermined difference vector and generating the frequency offset detection signal in the training mode.

In the second frequency offset compensation apparatus, the prediction is effected during the training period or during the training period when the correlation exceeds the reference value.

The correlation may be detected using the output of the equalizer and a signal obtained by judging or digitizing the output of the equalizer. That is, according to the present invention there is provided a third automatic frequency compensation apparatus comprising: a frequency offset compensation portion for, in accordance with a frequency offset detection signal, rotating a phase of a quadrature baseband signal provided through a non-synchronizing quadrature detection of a time-division-multiplex digital modulation signal received; an equalizing portion for equalizing the quadrature baseband signal from the frequency offset compensation portion to remove a distortion included in the quadrature baseband signal from the frequency offset compensation portion and outputting the frequency offset compensated and equalized baseband signal; a first difference vector generation portion for continuously generating a difference vector between signals in two consecutive symbol intervals of the quadrature baseband signal from the equalizing circuit and normalizing the difference vector; a judging portion for classifying the equalized quadrature baseband signal into a plurality of digit levels which the equalized quadrature baseband signal may show; a second difference vector generation portion for generating a second difference vector provided between signals in two consecutive symbol intervals of an output of the judging portion; a vector correlation portion responsive to the first and second difference vector generation portion for providing a frame vector correlation signal indicative of a correlation between the normalized difference vector and the second difference vector; a comparing portion for comparing the frame vector correlation signal with a predetermined value and generating a comparing result signal; and a frequency offset prediction portion responsive to the comparing result signal for predicting a frequency offset between an oscillation signal used for receiving the time-division-multiplex digital modulation signal and a center frequency of the time-division-multiplex digital modulation signal in accordance with the normalized difference vector and the predetermined difference vector, renewing the predicted frequency offset when the vector correlation is larger than the predetermined value, and generating the frequency offset detection signal.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
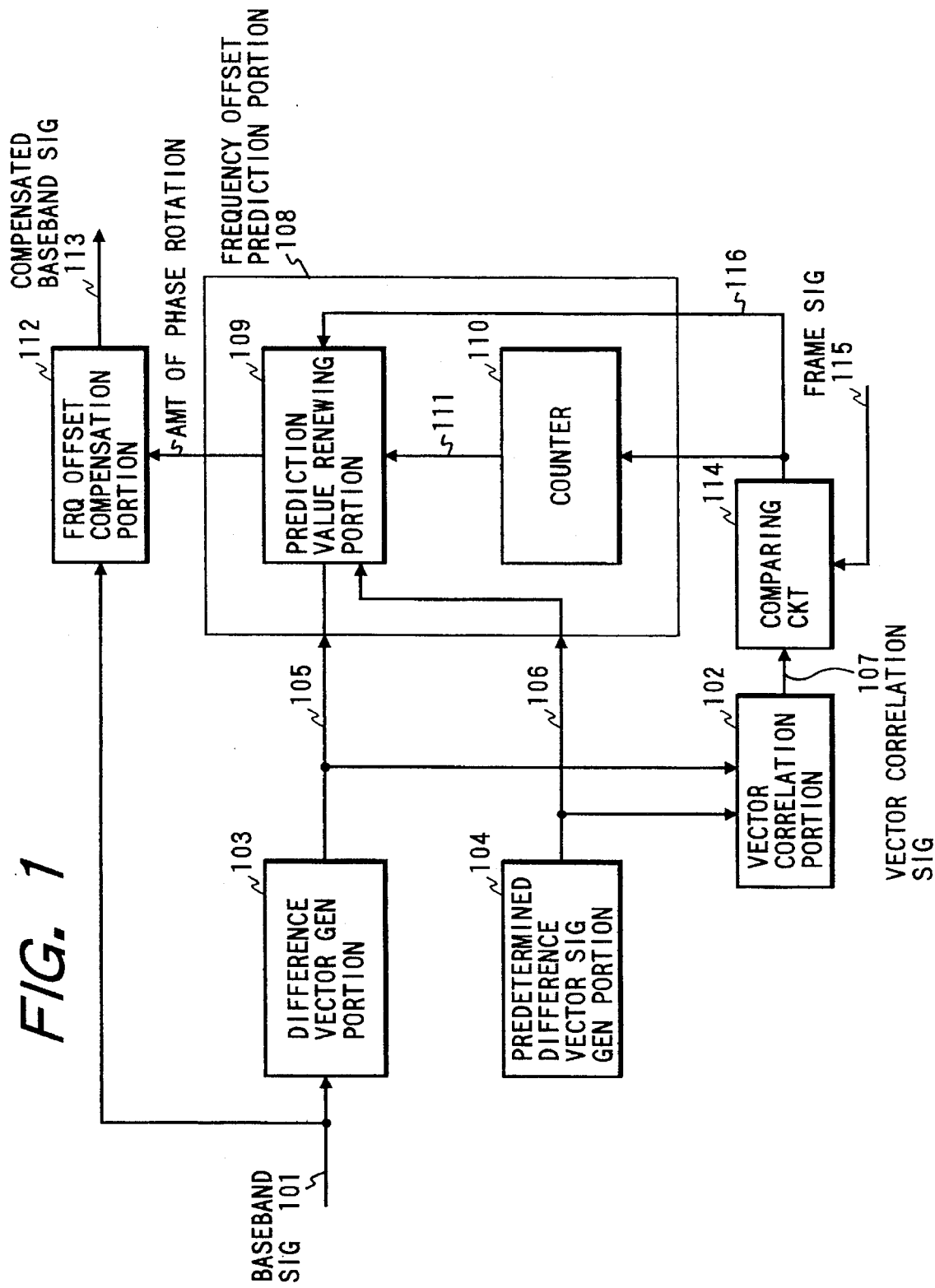
FIG. 1 is a block diagram of an automatic frequency offset compensation apparatus of a first embodiment.

FIG. 1 is a block diagram of an automatic frequency offset compensation apparatus of the first embodiment. The automatic frequency offset compensation apparatus of the first embodiment comprises a difference vector generation portion 103 for receiving a quadrature baseband signal, generating a difference vector signal 105 obtained by normalizing a vector product of a complex conjugate of a one-symbol preceding portion of the quadrature baseband signal and a vector of a current portion of the quadrature baseband signal 101, and continuously outputting the difference vector signal 105 every sampling interval of the quadrature baseband signal 101 and a predetermined difference vector signal generation portion 104 for generating a predetermined difference vector signal 106, a vector correlation portion 102 for calculating and generating a vector correlation signal 107 by accumulating the vector products of the difference vector signal 105 and the predetermined difference vector signal 106, a comparing circuit 114 for comparing an absolute value of a vector correlation signal 107 with a predetermined correlation threshold value once per a frame indicated by a frame signal 115, a frequency offset prediction value renewing portion 109 for predicting an amount of a phase rotation corresponding to the frequency offset from an average value of phase differences between the difference vector signal 105 and the predetermined difference vector signal 106 using a convergent coefficient only when the absolute value of the vector correlation signal 107 is larger than the predetermined correlation threshold value, a counter 110 for counting an output of the comparing circuit, i.e., the numbers of bursts in which the prediction value of a frequency offset is renewed, the prediction value renewing portion 109 decreasing the convergent coefficient with an increase in the counted number of the bursts, a frequency offset compensation portion 112 for phase rotating the quadrature baseband signal 101 in accordance with the amount of phase rotation derived from the frequency offset predicted by the frequency offset prediction portion 109 to compensate the quadrature baseband signal and for outputting a (frequency offset) compensated quadrature baseband signal 113.

An operation of the first embodiment will be described.

The difference vector generation portion 103 receives a quadrature baseband signal 101, generates a difference vector signal 105 obtained by normalizing the vector product of the complex conjugate of one-symbol preceding portion of the quadrature baseband signal and the vector of the current portion of the quadrature baseband signal 101, and continuously outputs the difference vector signal 105 every sampling interval of the quadrature baseband signal 101. The predetermined difference vector signal generation portion 104 generates the predetermined difference vector signal 106. The vector correlation portion 102 calculates and generates the vector correlation signal 107 by accumulating the vector products of the difference vector signal 105 and the predetermined difference vector signal 106. The comparing circuit 114 compares the absolute value of the vector correlation signal 107 with the predetermined correlation threshold value once per a frame indicated by the frame signal 115. The frequency offset prediction value renewing portion 109 predicts the amount of the phase rotation corresponding to the frequency offset from an average value of phase differences between the difference vector signal 105 and the predetermined difference vector signal 106 using the convergent coefficient only when the absolute value of the vector correlation signal 107 is larger than the predetermined correlation threshold value. The counter 114 counts the output of the comparing circuit, i.e., the numbers of bursts in which the prediction value of the frequency offset is renewed. The prediction value renewing portion 109 decreases the convergent coefficient with the increase in the counted number of the bursts. The frequency offset compensation portion 112 phase-rotates the quadrature baseband signal 101 in accordance with the amount of phase rotation derived from the frequency offset predicted by the frequency offset prediction portion 109 to compensate the quadrature baseband signal and outputs the (frequency offset) compensated quadrature baseband signal 113.

The predetermined correlation threshold value is about 80% of a product of the size of the normalized vector by the number of symbols in the predetermined difference vector signal. The predetermined difference vector signal includes a synchronizing signal, a preamble, and data in every burst.

According to this embodiment, when the vector correlation signal 107 outputted by the vector correlation portion 102 exceeds the predetermined threshold correlation value, the prediction value renewing portion 109 predicts the frequency offset from the difference vector signal 105 and the predetermined difference vector signal 106 and determines the amount of phase rotation, wherein with an increase in the count value the prediction value renewing portion 109 decreases the convergent coefficient used for the prediction. Therefore, the prediction operation is provided with a few times of predictions with a high accuracy even if a possibility that the absolute value of the vector correlation exceeds the predetermined correlation threshold value becomes low, so that the interval of predicting the frequency offset is long.

Figure 2:
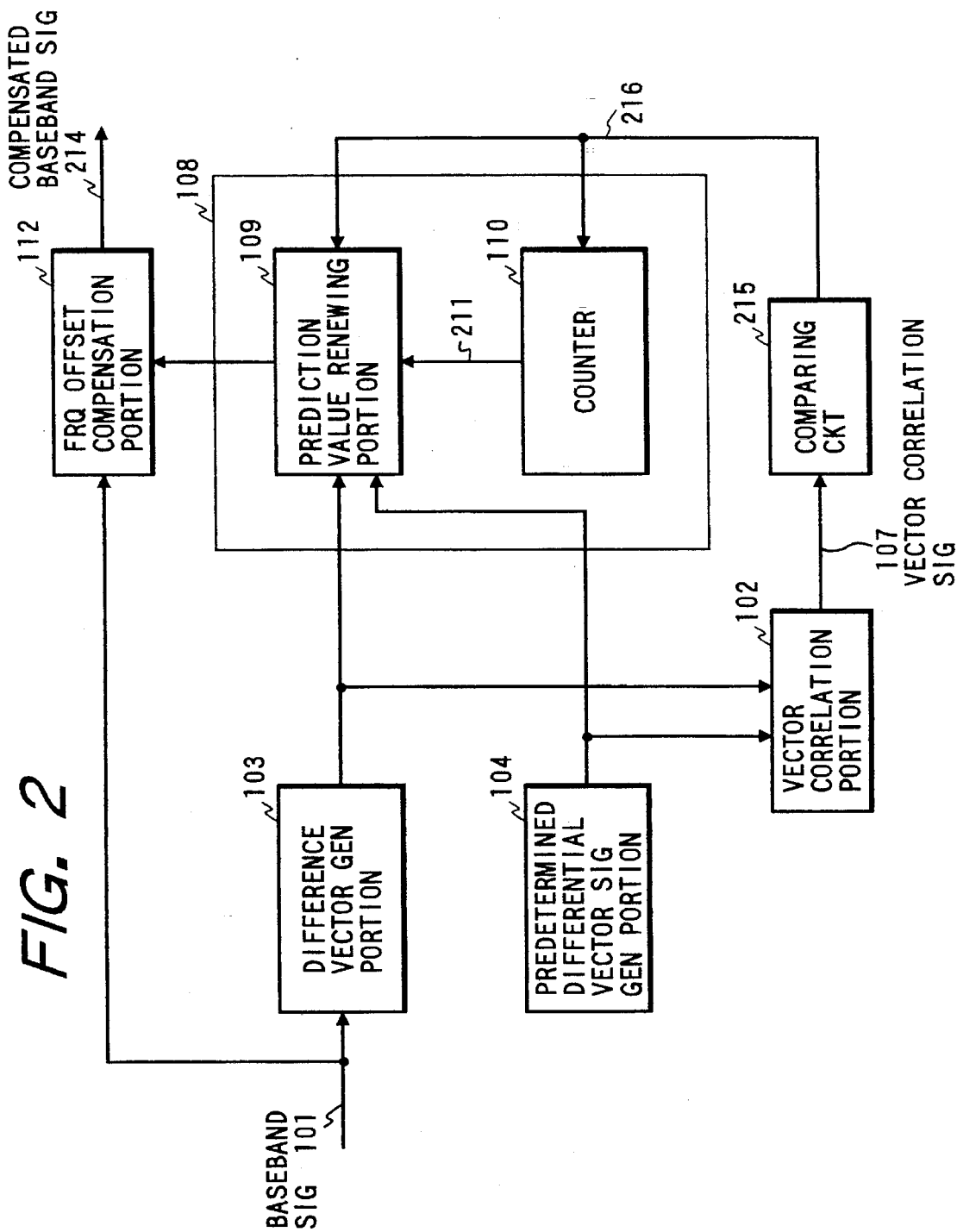
FIG. 2 is a block diagram of an automatic frequency compensation apparatus of a second embodiment.

A second embodiment will be described. FIG. 2 is a block diagram of an automatic frequency compensation apparatus of the second embodiment. The basic operation is similar to the first embodiment. The difference is in that the prediction value is renewed when the absolute value of the vector correlation signal 107 is larger than the predetermined correlation threshold value. Therefore, the renewing may occur a plurality of times per one frame.

That is, the comparing circuit 215 does not respond the frame signal 115 shown in FIG. 1 but responds to the vector correlation signal 107. Other structure is the similar to the first embodiment. The prediction value may be renewed when the absolute value of the vector correlation exceeds the predetermined correlation threshold value several times. Therefore, the frequency offset is predicted within a short interval.

Figure 3:
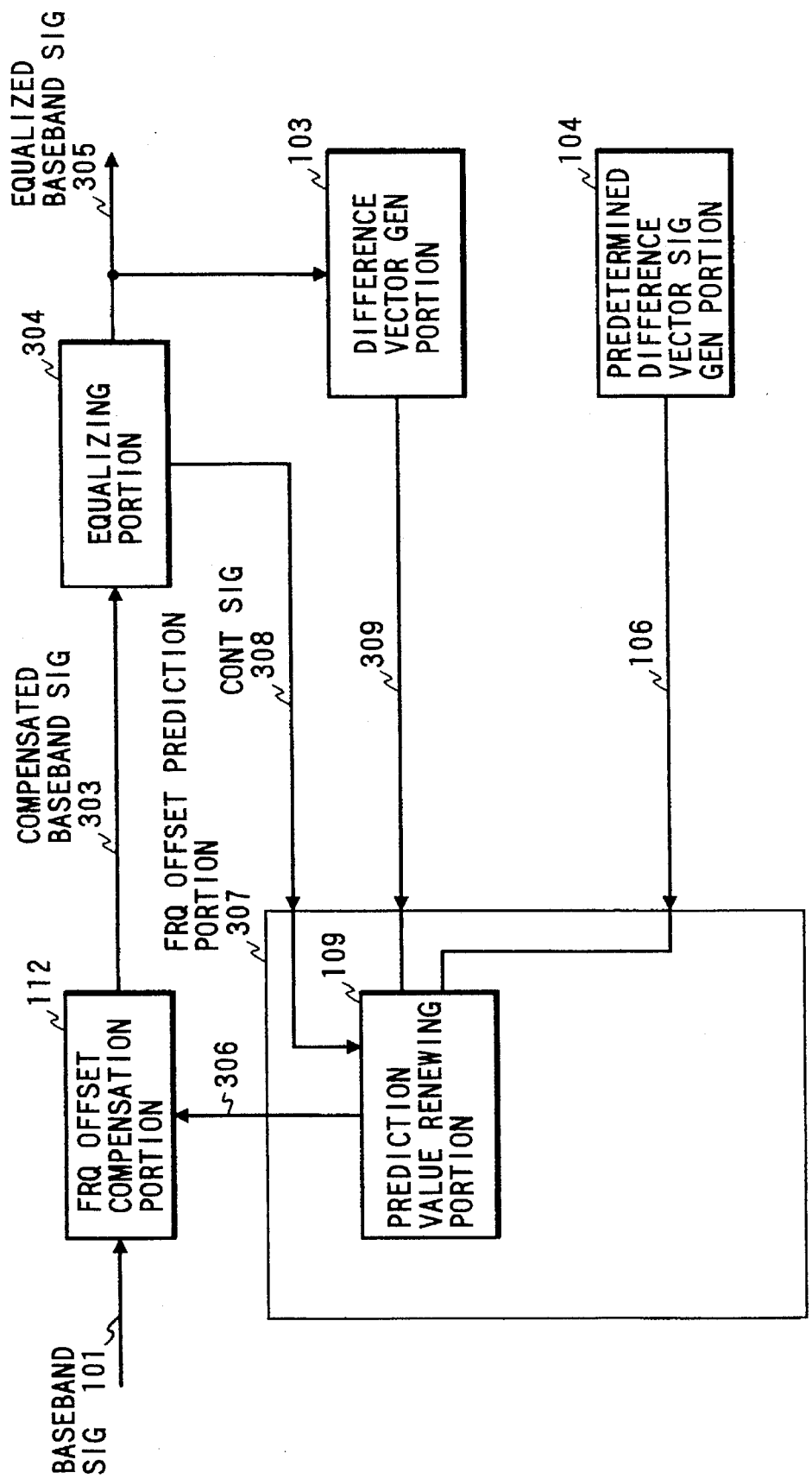
FIG. 3 is a block diagram of an automatic frequency compensation apparatus of a third embodiment.

A third embodiment will be described. FIG. 3 is a block diagram of an automatic frequency compensation apparatus of the third embodiment.

The automatic frequency compensation apparatus of the third embodiment comprises a frequency offset compensation portion 112 for effecting the frequency offset compensation to the baseband signal 101 in accordance with an offset control signal 306 indicative of an amount of phase rotation to generate a compensated baseband signal 303, an equalizing portion 304 for equalizing the compensate baseband signal 303 in a normal operation mode and for effecting a training of an equalizing circuit included in the equalizing portion 304 to determine a set of tap coefficients of the equalizing circuit using a predetermined synchronizing word included in the received baseband signal such that a distortion of the equalized baseband signal 305 further reduced and generating a control signal 308 in a training mode; a difference vector generation portion 103 for generating a difference vector signal 309 obtained by normalizing a product of a complex conjugate of a one-symbol proceeding portion of the equalized quadrature baseband signal 305 and a vector of a current portion of the equalized baseband signal 305, and continuously outputting the difference vector signal 309 every sampling interval; a predetermined difference vector signal generation portion 104 for generating the predetermined difference vector signal 106, a frequency offset prediction portion 307, including a prediction value renewing portion 109, for providing a frequency offset prediction and renewing the frequency offset prediction value supplied to the frequency offset compensation portion 112 from an average value of a phase difference between the difference vector signal 309 and the predetermined difference vector signal 106 in the training mode indicated by the control signal 308. An operation of the automatic frequency compensation apparatus of the third embodiment will be described.

The frequency offset compensation portion 112 effects the frequency offset compensation to the quadrature baseband signal 101 in accordance with an offset control signal 306 indicative of the frequency offset prediction value to generate the compensated baseband signal 113. That is, the frequency offset compensation portion 112 rotates a phase of the baseband signal 101 in accordance with the amount of phase rotation represented by the offset control signal 306 to generate the compensated baseband signal 303. The equalizing portion 304 equalizes (wave-shape-equalizes) the compensate baseband signal 303 in the operation mode and effects the training of the equalizing circuit included in the equalizing portion 304 to determine the set of tap coefficients of the equalizing circuit to reduce a distortion of the quadrature baseband signal using the predetermined synchronizing word as a training signal included in the received baseband signal and generates the control signal 308 having a logic H level in the training mode. The difference vector generation portion 103 generates the difference vector signal 309 obtained by normalizing a product of a complex conjugate of a one-symbol preceding portion of the equalized quadrature baseband signal 305 and a vector of a current portion of the equalized baseband signal 305 and continuously outputs the difference vector signal 309 every sampling interval. The predetermined difference vector signal generation portion 104 generates the predetermined difference vector signal 106. The frequency offset prediction portion 307 including the prediction value renewing portion 109 provides a frequency offset prediction and renewing the frequency offset prediction value supplied to the frequency offset compensation portion 112 from an average value of a phase difference between the difference vector signal 309 and the predetermined difference vector signal 106 in the training mode indicated by the control signal 308. At first, the equalizing portion determines the tap coefficients in the training mode and then, equalizes the compensated baseband signal 303 with the tap coefficients to output the equalized baseband signal in the normal operation mode.

Figure 4:
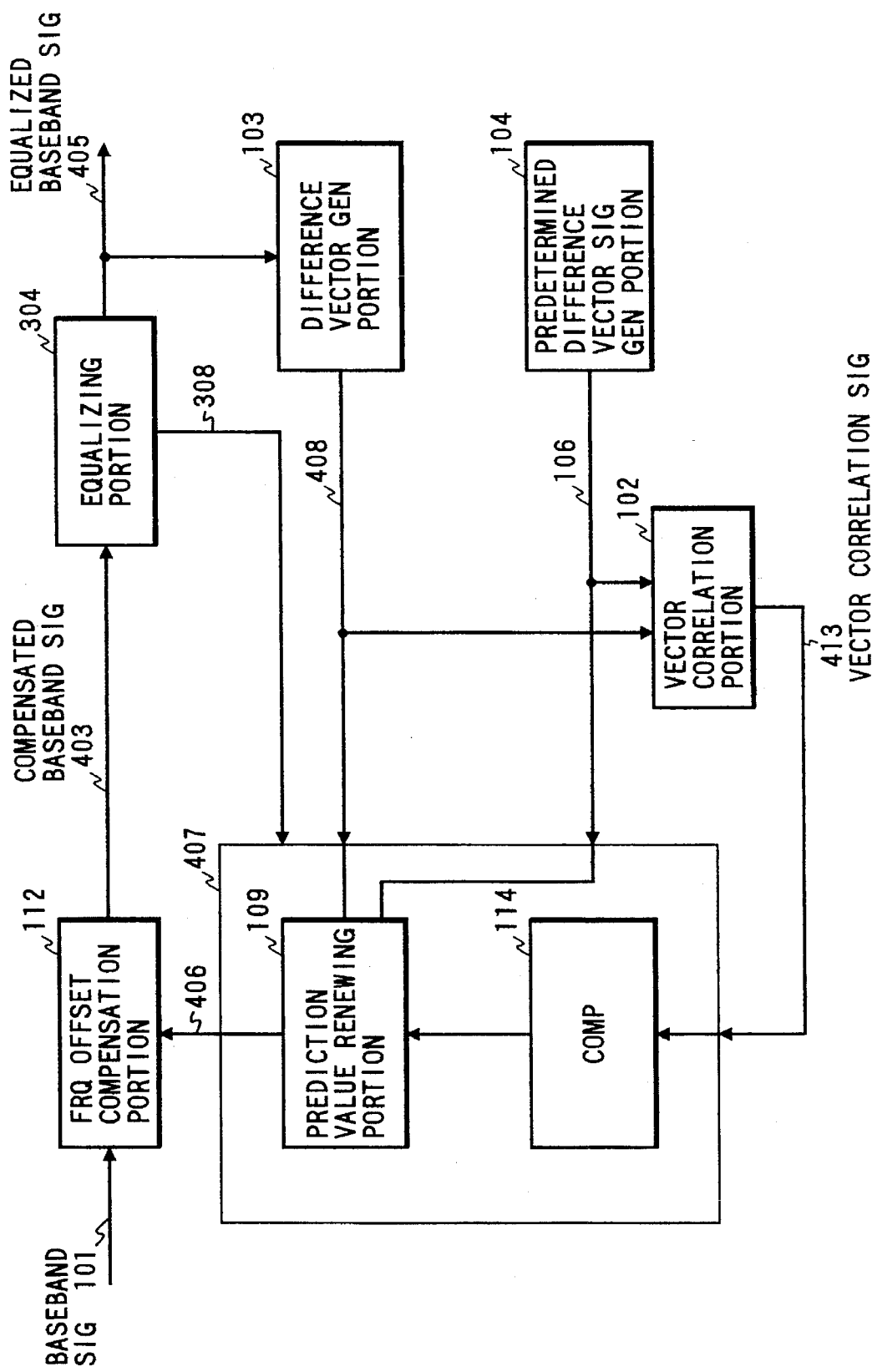
FIG. 4 is a block diagram of an automatic frequency compensation apparatus of a fourth embodiment.

A fourth embodiment will be described. FIG. 4 is a block diagram of an automatic frequency compensation apparatus of the fourth embodiment.

The automatic frequency compensation apparatus of the fourth embodiment comprises a frequency offset compensation portion 112 for effecting the frequency offset compensation to the quadrature baseband signal 101 in accordance an amount of phase rotation represented by an offset control signal 406 to generate a compensated baseband signal 403, an equalizing portion 304 for equalizing the compensate baseband signal 405 in a normal operation mode and for effecting a training of an equalizing circuit included in the equalizing portion 304 to determine a set of tap coefficients of the equalizing circuit using a predetermined synchronizing word included in the received baseband signal in a training mode; a difference vector generation portion 103 for generating a difference vector signal 408 obtained by normalizing a product of a complex conjugate of a one-symbol proceeding portion of the equalized quadrature baseband signal 405 and a vector of a current portion of the equalized baseband signal 405, and continuously outputting the difference vector signal 408 every sampling interval; a predetermined difference vector signal generation portion 104 for generating a predetermined difference vector signal 106, a vector correlation portion 102 for calculating and generating a vector correlation signal 413 by accumulating vector products of the difference vector signal 408 and the predetermined difference vector signal 106, a comparator 114 for comparing an absolute value of a vector correlation signal 413 with a predetermined correlation threshold value, a frequency offset prediction value renewing portion 109 for predicting an amount of a phase rotation corresponding to a frequency offset from an average value of phase differences between the difference vector signal 408 and the predetermined difference vector signal 106 using a convergent coefficient only when the absolute value of the vector correlation signal 413 is larger than the predetermined correlation threshold value, a frequency offset compensation portion 112 for phase rotating the quadrature baseband signal 101 in accordance with the offset control signal 406 indicative of the amount of phase rotation derived from the frequency offset predicted by the frequency offset prediction portion 109 to compensate the quadrature baseband and for outputting the frequency offset compensated quadrature baseband signal 403.

Figure 5:
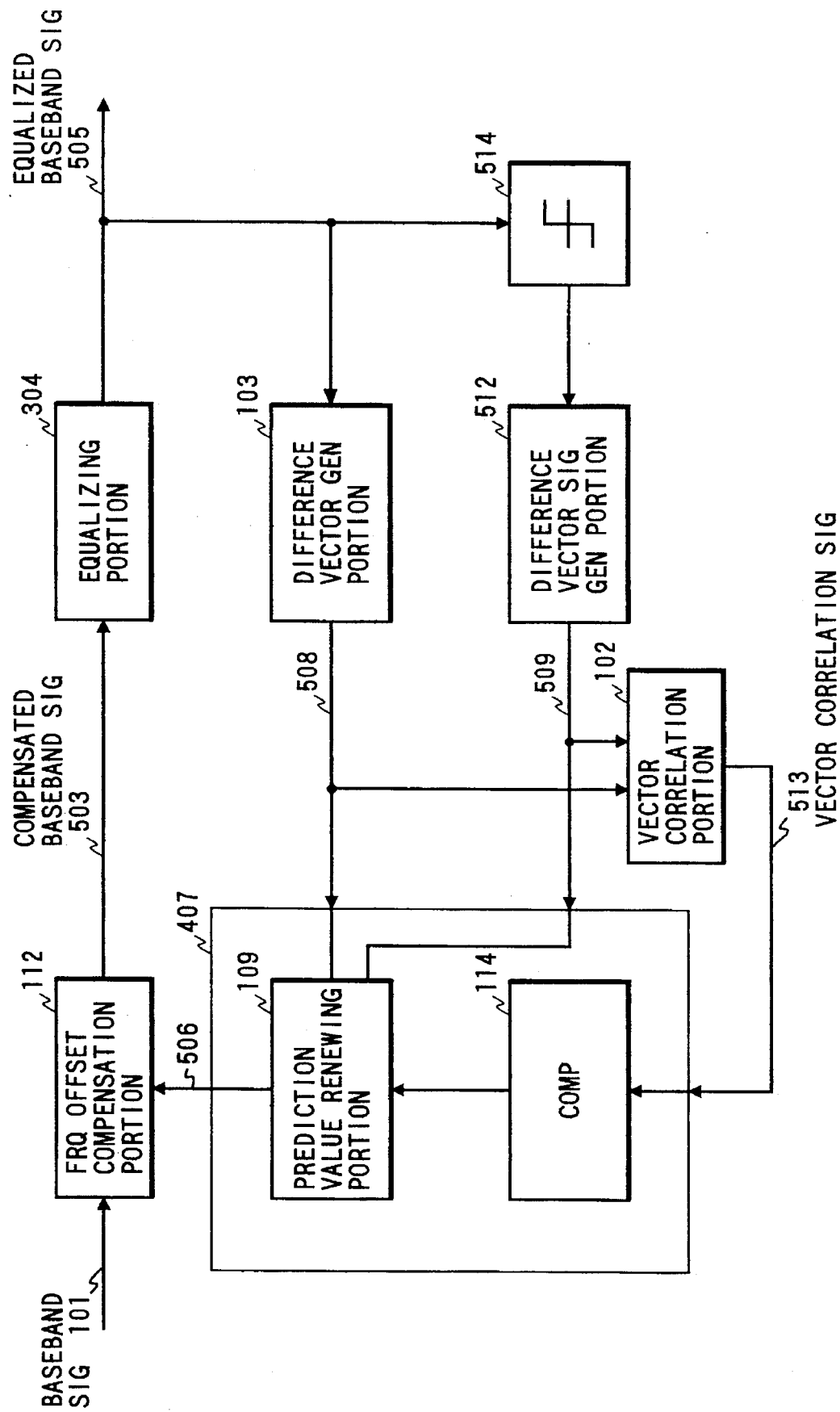
FIG. 5 is a block diagram of an automatic frequency compensation apparatus of a fifth embodiment.
Figure 6:
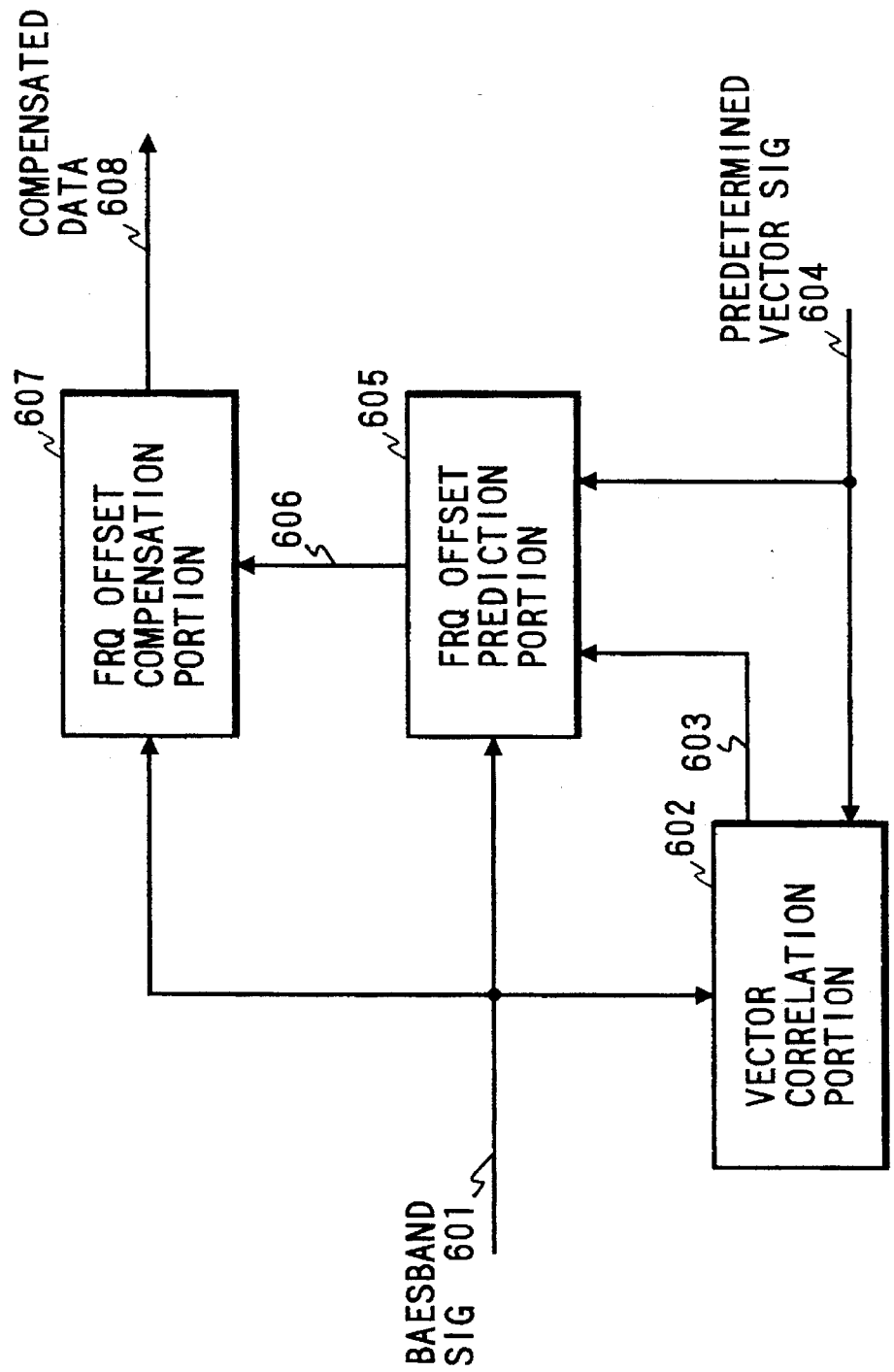
FIG. 6 is a block diagram of a prior art automatic frequency offset compensation apparatus.

A fifth embodiment will be described. FIG. 5 is a block diagram of an automatic frequency compensation apparatus of the fifth embodiment. The basic operation is similar to the fourth embodiment. The difference is in that the predetermined difference vector signal generation portion 104 is replaced by a difference vector signal generation portion 512 and a judging circuit 514 is added. The judging circuit 514 judges the value of the equalized baseband signal 505. That is, the judging circuit 514 classifies the equalized baseband signal 505 into a plurality of digit levels, that is, if the quadrature phase shift keying (QPSK) is employed as the digital modulation, it is classified (digitized) into (1, 1), (−1, 1), (1, −1), and (−1, −1). The predetermined difference vector signal generation portion 512 generates the difference vector signal provided between signals in two consecutive symbol intervals of an output of the judging circuit 514. Therefore, the difference vector generation portion 103 generates the difference vector from an analog signal of the equalized baseband signal. On the other hand, the difference vector signal generation portion 512 generates the difference vector from the digital signal of the output of the judging circuit 514.

Other structure is tile similar to the third embodiment. The renewing and the prediction are made when the vector correlation signal 513 is larger than the predetermined correlation threshold value from the difference vector signal 508 and the difference vector signal 509 and determines the amount of phase rotation. Therefore, the prediction operation is provided with a few times of predictions with a high accuracy even if a possibility that the absolute value of the vector correlation exceeds the predetermined correlation threshold value becomes low (in a multipass phasing condition), so that the interval of predicting the frequency offset is long.

What is claimed is:

1. An automatic frequency compensation apparatus comprising:

first difference vector generation means for continuously generating at least a difference vector provided between first signals in two consecutive first symbol intervals of a quadrature baseband signal per said first symbol period, said quadrature baseband signal being provided through a non-synchronizing quadrature detection of a time-division-multiples digital modulation signal received and for normalizing said difference vector;

second difference vector generation means for generating a predetermined difference vector provided between second signals in two consecutive second symbol intervals of a predetermined time-division multiplex frame synchronizing signal;

vector correlation means responsive to said first and second difference vector generation means for providing a frame vector correlation signal indicative of a correlation between the normalized difference vector and said predetermined difference vector;

comparing means for comparing said frame vector correlation signal with a predetermined value and generating a comparing result signal;

counting means for counting said comparing result signal when said vector correlation is larger than said predetermined value;

frequency offset prediction means responsive to said comparing result signal for predicting a frequency offset of an oscillation signal used for receiving said time-division-multiplex digital modulation signal from a center frequency of said time-division-multiples digital modulation signal in accordance with said normalized difference vector and said predetermined difference vector, renewing the predicted frequency offset using a convergent coefficient when said vector correlation is larger than said predetermined value, and decreasing said convergent coefficient with an increase in an output of said counting means; and frequency offset compensation means for rotating a phase of said baseband signal in accordance with the predicted frequency offset to output the frequency offset compensated baseband signal.

2. An automatic frequency compensation apparatus as claimed in claim 1, wherein said comparing means further responds to a frame signal of said quadrature baseband signal and compares and generates said comparing result signal once a frame of said frame signal.

3. An automatic frequency compensation apparatus as claimed in claim 1, wherein said comparing means generates said comparing signal irrespective of a frame of said quadrature baseband signal.

4. An automatic frequency compensation apparatus comprising:

frequency offset compensation means for, in accordance with a frequency offset detection signal, rotating a phase of a quadrature baseband signal provided through a non-synchronizing quadrature detection of a time-division-multiples digital modulation signal received;

equalizing means for equalizing the quadrature baseband signal from said frequency offset compensation means to remove a distortion included in the quadrature baseband signal from said frequency offset compensation means and outputting the frequency offset compensated and equalized baseband signal in a normal operation and for performing a training to determine a condition of said equalizing means using a predetermined training signal included in said quadrature baseband signal in a training mode such that said distortion is further removed;

first difference vector generation means for continuously generating a difference vector between signals in two consecutive symbol intervals of said quadrature baseband signal from said equalizing means and normalizing said difference vector;

second difference vector generation means for generating a predetermined difference vector provided between signals in two consecutive symbol intervals of a predetermined time-division multiplex frame synchronizing signal; and frequency offset prediction means for predicting a frequency offset between an oscillation signal used for receiving said time-division-multiplex digital modulation signal and a center frequency of said time-division-multiplex digital modulation signal in accordance with said normalized difference vector and said predetermined difference vector and generating said frequency offset detection signal in said training mode.

5. An automatic frequency compensation apparatus comprising:

frequency offset compensation means for, in accordance with a frequency offset detection signal, rotating a phase of a quadrature baseband signal provided through a non-synchronizing quadrature detection of a time-division-multiplex digital modulation signal received;

equalizing means for equalizing the quadrature baseband signal from said frequency offset compensation means to remove a distortion included in the quadrature baseband signal from said frequency offset compensation means and outputting the frequency offset compensated and equalized baseband signal in a normal operation mode and for performing a training to determine a condition of said equalizing means using a predetermined training signal included in said quadrature baseband signal in a training mode such that said distortion is further removed;

first difference vector generation means for continuously generating a difference vector between signals in two consecutive symbol intervals of said quadrature baseband signal from said equalizing means and normalizing the difference vector;

second difference vector generation means for generating a predetermined difference vector provided between signals in two consecutive symbol intervals of a predetermined time-division multiplex frame synchronizing signal;

vector correlation means responsive to said first and second difference vector generation means for providing a frame vector correlation signal indicative of a correlation between the normalized difference vector and said predetermined difference vector;

comparing means for comparing said frame vector correlation signal with a predetermined value and generating a comparing result signal; and frequency offset prediction means responsive to said comparing result signal for predicting a frequency offset between an oscillation signal used for receiving said time-division-multiplex digital modulation signal from a center frequency of said time-division-multiplex digital modulation signal in accordance with said normalized difference vector and said predetermined difference vector, renewing the predicted frequency offset when said vector correlation is larger than said predetermined value in said training mode, and generating said frequency offset detection signal.

6. An automatic frequency compensation apparatus comprising:

frequency offset compensation means for, in accordance with a frequency offset detection signal, rotating a phase of a quadrature baseband signal provided through a non-synchronizing quadrature detection of a time-division-multiplex digital modulation signal received;

equalizing means for equalizing the quadrature baseband signal from said frequency offset compensation means to remove a distortion included in the quadrature baseband signal from said frequency offset compensation means and outputting the frequency offset compensated and equalized baseband signal;

first difference vector generation means for continuously generating a difference vector between signals in two consecutive symbol intervals of said quadrature baseband signal from said equalizing circuit and normalizing the difference vector;

judging means for classifying the equalized quadrature baseband signal into a plurality of digit levels which the equalized quadrature baseband signal may show;

second difference vector generation means for generating a second difference vector provided between signals in two consecutive symbol intervals of an output of said judging means;

vector correlation means responsive to said first and second difference vector generation means for providing a frame vector correlation signal indicative of a correlation between the normalized difference vector and said second difference vector;

comparing means for comparing said frame vector correlation signal with a predetermined value and generating a comparing result signal; and frequency offset prediction means responsive to said comparing result signal for predicting a frequency offset between an oscillation signal used for receiving said time-division-multiplex digital modulation signal and a center frequency of said time-division-multiplex digital modulation signal in accordance with said normalized difference vector and said predetermined difference vector, renewing the predicted frequency offset when said vector correlation is larger than said predetermined value, and generating said frequency offset detection signal.

* * * * *